United States Patent [19]

Trachte et al.

[11] 3,976,338
[45] Aug. 24, 1976

[54] SLIDE/RUBBER TORSION-BEARING SUPPORT FOR THE ABSORPTION OF AXIAL AND RADIAL FORCES

[75] Inventors: Kurt Trachte, Echterdingen; Walter Willingshofer, Hofingen; Einhard Kleinschmit, Esslingen, all of Germany

[73] Assignee: Daimler-Benz Aktiengesellschaft, Germany

[22] Filed: Aug. 23, 1974

[21] Appl. No.: 500,068

[30] Foreign Application Priority Data

Aug. 25, 1973 Germany............................ 2342990

[52] U.S. Cl................................. 308/26; 267/54 A; 267/57.1 R; 267/63 A; 308/237 R; 403/221; 403/225
[51] Int. Cl.²...................... F16C 27/06; F16F 1/38
[58] Field of Search................. 308/3 R, 3.5, 15, 26, 308/DIG. 8, 237 R; 267/54 R, 54 A, 54 B, 55, 57.1 R, 57.1 A, 63 A; 293/96; 403/220, 221, 223, 225, 228

[56] References Cited
UNITED STATES PATENTS

| | | | |
|---|---|---|---|
| 1,835,575 | 12/1931 | Sanders et al.................. | 267/54 R X |
| 2,229,429 | 1/1941 | Travilla, Jr..................... | 267/63 A X |
| 2,238,197 | 4/1941 | Watson............................. | 308/26 |
| 2,642,318 | 6/1953 | Ricks................................ | 308/26 |
| 2,980,439 | 4/1961 | Miller............................. | 267/63 A X |
| 2,995,462 | 8/1961 | Mitchell et al................. | 308/DIG. 8 |
| 3,039,831 | 6/1962 | Thomas........................... | 308/26 |
| 3,147,964 | 9/1964 | Wolf................................ | 267/54 A X |
| 3,471,164 | 10/1969 | Tyerman........................ | 308/26 X |

FOREIGN PATENTS OR APPLICATIONS

| | | | |
|---|---|---|---|
| 741,746 | 2/1933 | France........................... | 267/54 A |
| 186,226 | 3/1965 | U.S.S.R........................ | 308/26 |

*Primary Examiner*—L. J. Paperner
*Assistant Examiner*—Randolph A. Reese
*Attorney, Agent, or Firm*—Craig & Antonelli

[57] ABSTRACT

An elastic pivotal bearing support of a structural part carrying out exclusively angular movements, particularly in individual wheel suspensions of motor vehicle wheels, which absorbs forces directed axially and/or radially to the pivot axis and which transmits the same into a frame; the pivot bearing support is thereby equipped with two coaxial sleeves, namely, an inner sleeve and an outer sleeve which are under radial prestress from the presence of a rubber-elastic material with a layer thickness sufficient to absorb shocks; one sleeve is connected with the frame and the other with the structural part, whereby the two sleeves immovably adhere at the contact surface of the rubber-elastic material during pivotal movements of the structural part; at least one axial collar is provided which is moved along with the structural part and at least one further corresponding axial collar is provided which is moved along with the frame; a layer of rubber-elastic material of shock-absorbing thickness is arranged between the two collars whereby the axial cushion or cushions formed thereby is or are separate from the radial cushion formed by the rubber-elastic material between the inner and outer sleeve and/or an axial slide bearing is arranged between an axial collar or a respective one of each of the corresponding axial collars and the associated axial cushion.

122 Claims, 4 Drawing Figures

SLIDE/RUBBER TORSION-BEARING SUPPORT FOR THE ABSORPTION OF AXIAL AND RADIAL FORCES

The present invention relates to a radially and axially elastically yielding pivot bearing support of a structural part carrying out exclusively angular movements, especially in the individual wheel suspension of moter vehicle wheels, for the absorption of forces directed axially and/or radially to the pivot axis and for the transmission thereof into a frame, which includes two sleeves or bushes arranged coaxially to one another (inner and outer sleeve or bush) and filled out one underneath the other by rubber-elastic material with a shock-absorbing layer thickness that is subjected to a radial prestress (radial cushion), of which one sleeve or bush is connected with the frame and the other with the structural part and which, during a pivot movement of the structural part, both continue to adhere immovably on the rubber-elastic material at the contact surface thereof, and at least one axial collar moved in unison with the structural part and at least one further corresponding axial collar moved in unison with the frame, and with a layer of rubber-elastic material of shock-absorbing thickness (axial cushion) arranged between the collars.

Such bearings are known as torsion bearings, in which during the pivot movements of the inner sleeve with respect to the outer sleeve the prestressed rubber cushion rolls off like a cake-dough between displaced or moved surfaces. The pressure stress of the enclosed rubber cushion and the adherence at the moved parts permits only a limited pivot angle in order that the torsional stress in the rubber does not rise non-permissively high. The return forces which occur during the pivoting action, are generally accepted. In the application to the individual wheel suspension of motor vehicle wheels, one obtains anyhow already a counter-force by the compressed vehicle spring during the inward spring deflection of the wheel. Since such bearings have no slide places, they are also service-free even in case of strong external dirt influence or exposure. By reason of the freedom from slide movements, it also possesses no initial break-away moment or torque because every transition from the condition of the rest-friction into the slide-friction is missing. This is very favorable as regards the requirement for spring comfort.

A disadvantage in these prior art bearings is the limited pivot path of the mutually relatively movable parts, limited by the maximum permissive torsional stress, which in the application to the individual wheel suspension will end up in a limitation of the wheel-spring-path or wheel-spring-travel. Especially in the axial cushions, the torsional paths are particularly large. On the other hand, it is necessary for a safe and reliable absorption of the axial forces to construct the axial cushions sufficiently large in diameter, yet to limit the same in the thickness to a predetermined amount in order that the inward spring deflection in the axial direction of the bearing does not become excessively large. The requirements for a large axial collar and a certain axial spring hardness (large axial carrying or load capacity) on the one hand, and for a large pivot angle, on the other, therefore run counter one another and render the aforementioned bearing unsuitable for the application with large axial loads and large pivot movements.

It is the aim of the present invention to so improve the aforementioned bearing supports that they are able to absorb without dfficulties large axial loads also with relatively large pivot angles, without, however, being spongy in the axial direction. An axial load of the pivot bearing and a radial load in certain directions occurs in individual wheel suspensions during braking. During this operation, the accurate guidance of the wheels must not be impaired.

The underlying problems are solved according to the present invention in that with the aforementioned pivot bearing support, the axial cushion or the two axial cushions is or are separate with respect to the radial cushion and/or in that an axial slide bearing is arranged between one axial collar or between each one of the corresponding axial collars and the associated axial cushion.

The separation of the rubber cushions for the radial and the axial forces, on the one hand, and the absorption of the axial forces by one slide bearing each, on the other, eliminate the problem of the torsional stresses in the axial cushion. Consequently, the axial cushion can be designed and constructed with respect to diameter and axial thickness thereof completely according to the requirements of the axial load and of the spring stiffness in the axial direction. A thrust load or tangential stress of the axial cushion does not occur during pivoting. A certain improvement of the prior art pivot bearing supports in the sense of the present invention already occurs if of the two aforementioned features, only one is used, namely, that though an axial slide bearing is provided, a separation from a structural point of view of the radial cushion and axial cushion is dispensed with or this separation is realized only incompletely, for example, in the form of a circumferential groove at the transition place from the radial into the axial cushion.

In order to construct the sleeves or bushes of the pivot bearing particularly simple on the one hand, yet to impart a certain form-stability to the axial cushion, on the other hand, provision is made according to the present invention that the axial cushion is provided axially on both end faces with one reinforcing sheet-metal member each vulcanized onto the same, of which one forms the axial collar and is supported at one of the end faces of one sleeve and of which the other cooperates as axial slide bearing with the axial collar connected with the other sleeve and constructed as axial slide bearing ring. In that connection, the one reinforcing sheet-metal member which supports itself at the one sleeve, may be provided with a circularly shaped groove or indentation concentric to the bearing axis for achieving an improved abutment, which groove or indentation serves as centering shoulder of the axial cushion at the sleeve end face.

In order to protect the axial slide bearing which is not to be treated as unproblematical as the torsional bearing with respect to the dirt influence, as well as possible against dirt access and penetration, provision is made according to the present invention that a sealing lip is provided at the rubber cushion, which is ring-shaped in cross section, which axially overlaps hook-shaped the slide bearing gap and the axial slide bearing ring with a radial spacing and which abuts under prestress at the back side thereof at an axially perpendicular surface. An axial impact and a radial impact of the axial slide bearing ring is possible without any difficulty owing to this construction of the sealing lip, without the sealing lip lifting off from the sealing surface. The sealing lip, by reason of the absence of a corresponding counter-surface or counter-edge, also is not exposed to the danger, even in case of strongest radial deflections of the bearing parts, to be squeezed off or sheared off between two metallic edges that approach one another. In order to retain the sealing lip form-stable also under strong deformation of the axial cushion, in such a manner that it does not lift off locally from the sealing surface, the reinforcing sheet metal member on the slide bearing side and serving as slide bearing disk of the axial cushion is appropriately extended up to into the root of the hook-shaped lip. For the protection of the sealing lip during extreme axial deflections of the pivot bearing support, an abutment shoulder extending beyond the axial extent of the sealing lip may be provided in the axial slide bearing ring.

In order to render the axial slide bearing service-free in that it can dispense with any subsequent lubricant and in order to cause therebeyond the disappearance of a break-away moment of the slide bearing, the reinforcing sheet-metal member serving as slide bearing disk may be provided on the slide side with a sintered bronze layer of conventional type and with a polytetrafluoroethylene layer embedded therein (so-called DU-disk) as well as preferably with a grease filling for the length of the life of the bearing. In order to prevent the entry of dirt and water into the space between the axial and radial cushion—the axial slide bearing gap terminates radially inwardly within this space—i.e., for the protection of this slide gap end, the sleeve-side reinforcing sheet-metal member of the axial cushion is therefore advantageously provided on the outer end face thereof with a thin rubber-elastic layer of any conventional type.

It is frequently desirable to pre-assemble the pivot bearing support which is subdivided into several parts, at the structural part to be pivotally fastened or at the frame. This desirability can be assisted in that the sleeve-side reinforcing sheet-metal member of the axial cushion is supported at the end face of th outer sleeve of the radial bearing and in that the axial slide bearing ring is secured at the corresponding end face of the inner sleeve and in that for this purpose the inner sleeve is extended axially by the overall dimension of axial bearing and axial cushion with respect to the end face of the outer sleeve or bush. Appropriately, the fastening between the inner radial bearing sleeve and the axial bearing slide ring may take place by a knurled press-fit. This permits a preassembly of the pivot bearing also under prestress of the axial cushion or cushions to the installed extent and dimension without causing the pivot bearing to swell or without the need to compress the pivot bearing support axially during the assembly or installation by the use of an auxiliary tool.

In order to encompass and seize also the axial slide bearing disks in the clamping means utilizing a clamping bolt axially clamping the pivot bearing in the installed condition, and fixing the same in the desired position, provision may be made according to the present invention that the axial slide bearing ring includes a radially inwardly directed shoulder overlapping the end face of the inner sleeve of the radial bearing.

In order to increase the radial stiffness of the radial cushion with approximately equal torsional softness, a further sheet metal bush or sleeve extending radially between the outer and the inner sleeve or bush may be arranged in the radial cushion. This intermediate sleeve, however, also serves simultaneously for the stabilization of the radial cushion with a construction of the cushion that is possibly not axially symmetrical. Such an asymmetry is appropriate, for example, in pivot bearing supports for cross guide members of individual wheel suspensions in vehicles for the absorption of radial forces whose direction of action is limited essentially to two mutually perpendicular planes (direction of gravity and horizontal direction). It is appropriate for the optimal matching of the spring characteristics of the radial cushion to the radial forces of the two planes of action that the radial cushion and/or the outer sleeve be so constructed that the elasticity of the pivot bearing support possesses different spring characteristics in the two planes of action. By a suitable deviation of the outer sleeve from the circular shape and/or by an appropriate hollow space arrangement in the radial cushion, it is possible to influence the spring characteristics of the pivot bearing support.

Since the pivot bearings in the application to cross guide members in individual wheel suspensions are stressed asymmetrically in the horizontal direction by the brake forces and lateral guidance forces, yet the individual elements for all pivot bearings of the cross guide members of a vehicle are to be constructed identical, it is appropriate for manufacturing reasons and for facilitating the assembly to constitute the spring characteristics of the pivot bearing support in a horizontal direction symmetrical to a center position. Since the inward spring deflection of the pivot bearing support must not become excessively large during braking, in order that the guidance of the wheels is not impaired to a non-permissive extent and the steering does not become too "spongy", the characteristic curve of the elasticity of the pivot bearing support should preferably be designed advantageously to increase progressively in the horizontal direction. This can be achieved, for example, in that the radial cushion includes in the not-yet-installed condition humps extending over a portion of the circumference at those places which will lie in the installed condition in the direction of the horizontal forces, whereby recesses or apertures are provided at the humps, which, as viewed in the circumferential direction and starting from their center, are of a size increasing toward the edges of the humps per circumferential length unit. These recesses or apertures may be appropriately provided in the form of at least one groove of varying depth arranged preferably axially symmetrically to the center of the radial cushion and extending in the circumferential direction.

For the better absorption of the road shocks transmitted by the wheels, the characteristics of the pivot bearing elasticity may be softer in the direction of gravity than in the horizontal direction, particularly as the accuracy of the wheel guidance is by far not influenced to the same extent by an inaccuracy of the cross guide bearing support in the direction of gravity than by an inaccuracy in the horizontal direction. Since the pivot bearing support is continuously prestressed in the direction of gravity by the inherent weight of the vehicle, the constant action of this base load can be taken into consideration in one direction in that the spring characteristic of the pivot bearing support in the direction of gravity is constructed asymmetrical to a center position at least in the unloaded condition of the pivot bearing support, for example, in that the inner sleeve and possibly the intermediate sleeve are arranged mutually eccentrically displaced in the direction of gravity in such a manner that under the proportion of the vehicle weight falling on a pivot bearing as bearing prestress, the sleeves are disposed concentrically to one another.

The softness of the pivot bearing support in the direction of the gravitational force can be attained in that the radial cushion is provided with flattened off portions at the places disposed in the installed condition at the top and at the bottom in the direction of the gravitational force, between which extends on both sides one arcuate, circular-shaped hump each. These humps were mentioned already hereinabove in further detail. With this construction, exclusively the rubber-elastic portions of the radial cushion arranged outside of the intermediate sleeve contribute to the spring softness of the radial cushion in the direction of gravity. In order to additionally use also the rubber-elastic material parts arranged on the inside of the sleeve for the constitution of the spring softness in the direction of gravity, provision may be made according to the present invention that the radial cushion includes between the inner sleeve and the intermediate sleeve a reniform aperture preferably interrupted by a remaining, narrow intermediate web extending axially in the center of the radial cushion, which aperture is arranged in the installed condition at the lowest place in the direction of the gravitational force. This reniform aperture may extend in the circumferential direction over an angle of approximately 60°.

Accordingly, it is an object of the present invention to provide a radially and axially elastically yielding pivot bearing support which avoids by simple means the aforementioned shortcomings and drawbacks encountered in the prior art.

Another object of the present invention resides in a pivot bearing for the absorption of axial and radial forces which is not limited to the same extent as the prior art bearings in the angle of its pivotal movement thereof.

A further object of the present invention resides in a slide/torsional bearing support for the absorption of axial and radial forces which does not unduly limit the spring path of the wheel when used in individual wheel suspensions.

Still another object of the present invention resides in a bearing support of the type described above which represents an excellent compromise as regards conflicting requirements of such bearings, particularly when used in individual wheel suspensions.

Another object of the present invention resides in a bearing support for the absorption of axial and radial forces which is able to absorb without difficulty relatively large axial loads with simultaneous, relatively large pivot angles and without being spongy in the axial direction.

A further object of the present invention resides in an elastic bearing support for the absorption of axial and radial forces for use in particular in individual wheel suspensions which does not impair the accurate guidance of the wheels, yet is capable of absorbing relatively large axial loads while at the same time enabling relatively large pivot deflections.

Still a further object of the present invention resides in an elastic bearing structure of the type described above which is particularly simple in construction, easy to install and permits preassembly without requiring special tools.

Another object of the present invention resides in an elastic bearing structure of the type described above which is relatively service-free, is well-protected against dirt and water eliminates the danger of possibly squeezing or shearing off parts of the elastic materials thereof.

These and further objects, features and advantages of the present invention will become more apparent from the following description when taken in connection with the accompanying drawing which shows, for purposes of illustration only, one embodiment in accordance with the present invention, and wherein:

Figure 2:
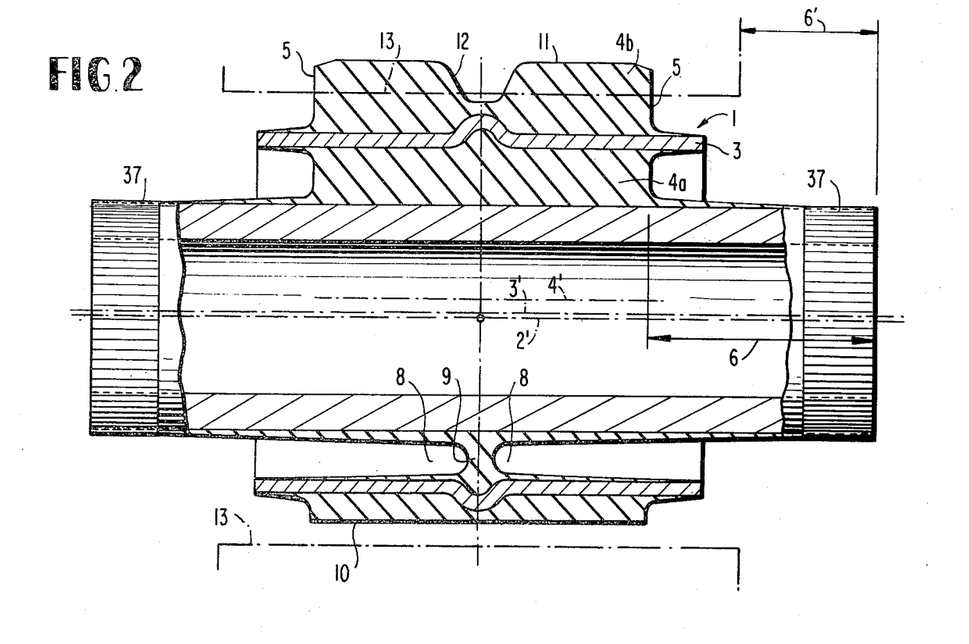
FIG. 2 is an axially parallel longitudinal cross-sectional view of the part of the pivot bearing support of the present invention which absorbs the radial forces, in the disassembled condition thereof.
Figure 3:
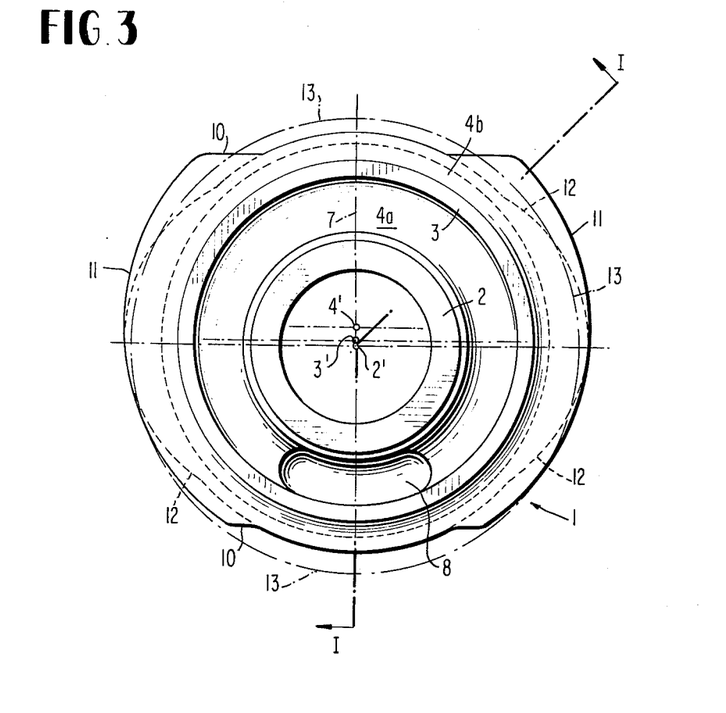
FIG. 3 is an axial end elevational view of the part of the pivot bearing support absorbing the radial forces, as illustrated in FIG. 2.

Referring now to the drawing wherein like reference numerals are used throughout the various views to designate like parts, with the radialtorsional bearing part generally designated by reference numeral 1 which is illustrated in FIGS. 2 and 3, a radial cushion 4a, 4b rubber which is interrupted by an intermediate sleeve 3 (with geometric axis 3') is mounted on an inner sleeve or bush 2 with geometric axis 2'. For manufacturing and rigidity reasons, the intermediate sleeve 3 has a certain projecting length with respect to the end faces 5 of the rubber cushion. For the same reasons as well as for influencing the radial rigidity, a circumferential groove is also provided at the intermediate sleeve 3. The inner sleeve 2 has a considerable projecting length 6 with respect to the end faces 5 of the radial cushion 4a, 4b on both sides thereof and the projecting length 6' with respect to the end face of the outer sleeve 13, indicated in dash and dot lines. This projecting length serves for the fastening of the axial bearing to be described more fully hereinafter. In order not to have to maintain such close manufacturing tolerances and nonetheless to obtain in all cases a press-fit with good holding ability that is also easily adapted to be pressed in, a knurled surface 37 is provided at the ends of the inner sleeve 2, which slightly piles up the material.

The radial cushion is not constructed axially symmetrical. Instead, the intermediate sleeve 3 is arranged slightly eccentrically to the inner sleeve 2 in the unstressed condition of the radial bearing part 1 so that the corresponding axes 2' and 3' have a slight spacing from one another. The outer contour, to be more fully described hereinafter, of the outer radial cushion 4b is cylindrically shaped within certain areas; the axis 4' of this cylinder surface, however, is disposed eccentrically to the axis 2' of the inner sleeve 2 in the same direction as the axis 3' of the intermediate sleeve 3 but by a larger amount. This direction of eccentricity determines in the bearing part 1 a plane 7 which during the installation into the pivot bearing support has to be placed in the direction of the base radial load owing to the vehicle weight. Symmetric to this plane 7, however, opposite to the direction of eccentricity, a reniform aperture 8 is provided between the inner sleeve 2 and the intermediate sleeve 3, which for manufacturing reasons is interrupted by a small intermediate web-like wall 9 disposed in the bearing center. The aperture 8 extends approximately over an angle of 60°. In the direction of the plane 7 at the top- and at the bottom-side of the bearing part 1, the cushion member 4b is provided with flattened off portions 10 whereby circularly shaped humps 11 remain on both sides to the right and to the left, which extend over an angular space of about 100° to 110°. One groove 12 each extending in the circumferential direction and of varying depth is worked into the humps 11 centrally thereof. And more particularly, beginning with the hump center—as viewed in the circumferential direction—with the groove depth zero, the groove becomes increasingly deeper toward the edges.

The inner contour of the outer sleeve or bush 13, shown in dash and dot lines in FIGS. 2 and 3, is disposed concentrically to the axis 2' of the inner sleeve 2, into which the bearing part 1 is pressed in. However, this concentric position will be assumed by the sleeves only under the radial base load by reason of the deformation of the humps 11 and of the aperture 8. The spring characteristics of the radial cushion 4a, 4b is relatively soft in the direction of the plane 7 by reason of the material removal within the area of the plane 7 (flattened portion 10 and aperture 8). Conversely, the spring characteristics are relatively hard in the direction transverse to the plane 7 by reason of the humps 11 extending transversely to the plane 7. By reason of the decreasing depth of the groove 12 which decreases toward the center of the humps 11, the characteristics will become even harder with increasing lateral load and stress of the radial cushion.

At least the outer part 4b of the radial cushion 4a, 4b will be subjected to a strong radial prestress as a result of pressing-in the bearing part 1 into the outer sleeve 13 connected with the structural part 14 to be pivotally supported. This prestress permits a relatively easy torsional movement of the inner sleeve 2 with respect to the outer sleeve 13, which is relatively easy within predetermined limits and without danger. The radial cushion is thereby squeezed and pressed, i.e., kneaded in the circumferential direction within the annularly shaped intermediate space between the sleeves without, however, the occurrence of relative movements between the rubber cushion and the sleeves in the mutual contact surfaces.

Figure 4:
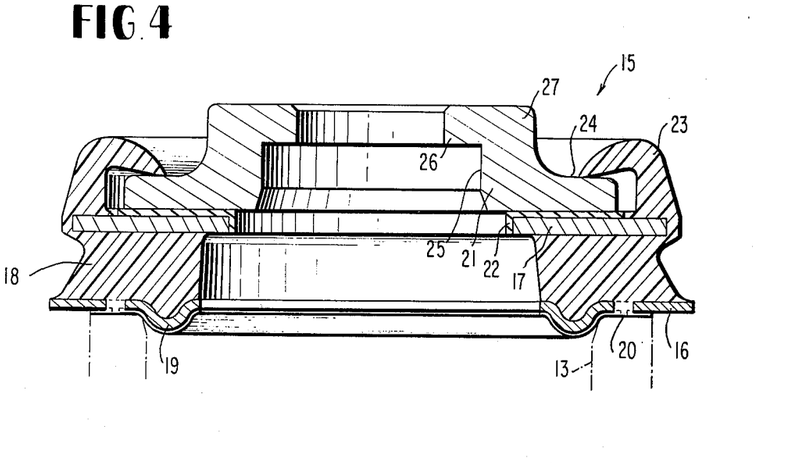
FIG. 4 is an axially parallel cross-sectional view through the part of the pivot bearing support according to the present invention which absorbs the axial forces.

The axial bearing generally designated by reference numeral 15 which is illustrated in FIG. 4, includes an axial cushion 18 made of rubber and having a shock-absorbing layer-thickness, which extends perpendicularly to the axis and is protected and stabilized on both sides by one reinforcing sheet-metal member 16 and 17, each. The one sleeve-side reinforcing sheet-metal member 16 which is supported at the end face of the already mentioned outer sleeve 13 of the bearing (FIG. 1), includes a circumferential groove or indentation 19 arranged concentrically to the bearing axis, for the purpose of centering the axial bearing, and is provided also with a rubber coating 20. The rubber coating 20 serves for sealing off the gap between the end face of the outer sleeve 13 and the reinforcing member 16 against water, mud and dust. The reinforcing sheet-metal member 16 has the task to transmit the axial forces from the end face of sleeve 13—its contour is indicated in dash and dot lines—by way of a large area into the axial cushion 18.

The other reinforcing sheet metal member 17 serves a similar task. This reinforcing member 17 cooperates with an axial slide ring 21 and has to transmit the axial forces exerted by this slide ring 21 into the axial cushion 18 by way of large areas. In addition thereto, the reinforcing sheet-metal member 17 also acts at the same time as a slide bearing disk. For reducing the slide friction between the bearing disks 17 and 21, the reinforcing member 17 includes a coating 22 which consists of a layer of sintered bronze and of a layer of polytetrafluoroethylene (PTFE), embedded therein. This slide layer as well as a life-long grease-filling completely dispense with the need of a subsequent lubrication of the slide bearing gap and eliminate a break-away moment of the bearing since PTFE possesses optimum slide properties as regards self-lubrication and rest-friction coefficient. For the protection of the slide surface gap against the entry of dirt, there is provided on the one hand, the rubber coating 20 (protection at the radially inner end of the slide bearing gap) and, on the other, a ring-shaped sealing lip 23 connected with the rubber cushion 18, which is hook-shaped in cross section and overlaps the slide gap and the axial slide bearing ring 21. In order to permit a radial movement of the axial slide ring 21 with respect to the sealing lip 23, without butting against the sealing lip from the inside thereof, the lip 23 is arranged at a radial distance with respect to the outer contour of the ring 21. In order to be able to follow also axial movements of the ring 21 without lifting off, the sealing lip 23 is arranged slightly obliquely in its nearly axially perpendicular, radially inwardly extending portion. The ring 21 is of such thickness in relation to the completely unstressed lip 23 that the lip 23 abuts with prestress on the back side 24 of the axial slide ring 21 which is correspondingly finely machined thereat. The reinforcing sheet metal member 17 extends up to into the root of the sealing lip 23 in order to shield deformations of the cushion member 18 from the sealing lip 23 so that the sealing lip remains form-stable also in case of a stronger unilateral cushion compression and always abuts sealingly at the sealing surface 24.

The axial slide ring 21 is provided with a stepped bore. The first larger diameter 25 (FIG. 4) of this bore is matched to the diameter of the inner sleeve 2 in such a manner that this portion is adapted to be pressed over the sleeve 2 with great retentive force. The adjoining shoulder 26 is intended to unequivocally fix the axial bearing in the longitudinal direction on the inner sleeve 2 and as to the rest is intended to offer a possibility to clamp together also the axial slide ring 21 with the inner sleeve 2 in the axial direction. Therebeyond, an abutment 27 which is ring-shaped and axially overlaps the sealing lip 23, is created by this configuration which serves the contact- and impact-protection of the sealing lip. This sealing lip should be protected against contacts deforming the sealing lip and thereby locally somewhat bulging the same and also against impacts locally squeezing the sealing lip. Radially outwardly, the sealing lip is exposed freely so that no impairment of the sealing lip and of its function is to be feared from this direction.

Figure 1:
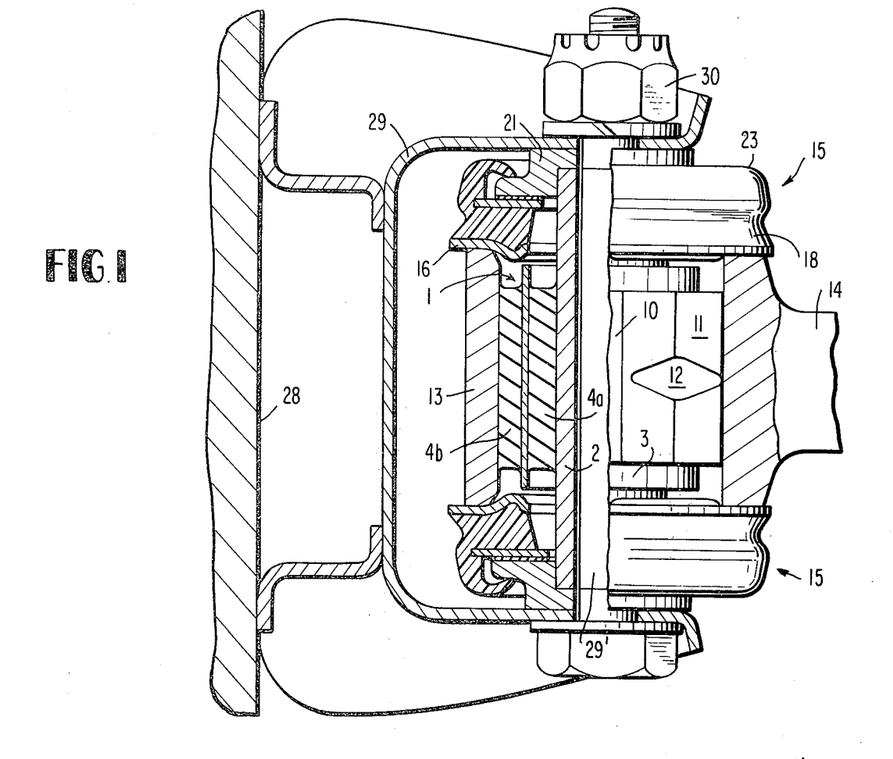
FIG. 1 is a cross-sectional view through a pivot bearing support in accordance with the present invention, taken along line I—I of FIG. 3.

Since now the most important individual parts of the pivot bearing support have been described in detail, the description of the pivot bearing support, illustrated in FIG. 1 at a reduced scale compared to the size of FIGS. 2 to 4, can now be kept relatively brief. Illustrated in plan view is a pivot bearing support of a passenger motor vehicle front wheel cross guide member 14 schematically indicated in part, whose arrangement and operation in principle is of conventional type and therefore presupposed as known. The cross guide member 14 together with the outer sleeve 13 is pivotally supported in the vehicle frame 28 which includes a load-bearing bearing fork 29 axially overlapping the pivotal bearing support. Between the arms of the fork 29, the individual parts 1 and 15 of the pivotal bearing support arranged in or at the outer sleeve 13 are securely clamped-in by a clamping bolt 29 (with a nut 30) so that the two axial slide rings 21 and the inner sleeve or bush 2 of the radial bearing part 1 are rigidly connected with the frame 28 and are connected immovably relative to each other. The radial bearing is pressed into the outer sleeve 13 in such a circumferential position that the reniform-shaped aperture 8 falls in the direction of the radial base load which is conditioned by the inherent weight of the vehicle. Depending on the inclination of the line of action of the cross guide member 14 to the horizontal and depending on the lever ratio with respect to the support springs possibly engaging at the same, the direction of action of the inherent weight force on the pivotal bearing support may deviate more or less strongly from the vertical. It is assumed in the instant description for the sake of simplicity that this weight-conditioned, radial base load falls in the direction of the gravitational force. During the braking, a rearwardly directed moment is exerted on the cross guide member 14 whereby in at least an approximately horizontal direction radial forces as well as axial forces are exerted on the pivotal bearing support. Since the spring characteristics of the yielding radial bearing is comparatively hard and progressively increasing in the horizontal direction, the precise and accurate straight guidance of the wheels is assured also during braking or in case of strong traction or in the presence of strong cross forces in curves. The spring characteristics are softer in the vertical direction in order to reduce road shocks and vibrations as far-reaching as possible and not to permit the same to reach the vehicle frame.

By reason of the inward spring deflection of the cross guide member 14, the latter carries out pivotal movements. These pivotal movements can be followed by the pivotal bearing support in the rubber cushions also in case of larger deflections without harm and without exceeding non-permissive stresses. The relative movements during pivoting between a predetermined point on the inner surface of the outer sleeve 13 and a point radially coordinated thereto in the center position on the outer surface of the inner sleeve 2 are relatively slight by reason of the relatively small diameters of the two sleeves in length units and the inclination of the connecting line with respect to the radial straight line is also relatively slight by reason of the relatively large thickness of the radial cushion relative to the diameter. In one construction of the axial bearing as torsional bearing, this could not be ascertained since the average diameter of the axial bearing is necessarily larger than the diameter in the radial bearing and the cushion thickness is smaller. Owing to the construction of the axial bearing as slide bearing which by reason of different measures is nearly as insensitive against freedom from lubricating requirements and against dirt as a torsional bearing, the axial bearing is completely unimpaired in the pivot path. The attempt to render an axial bearing constructed as torsional bearing also suitable for larger pivot paths, would not only lead to a pair of axial bearings of quite large volumes but would lead also to return forces whose magnitudes would not be completely negligible compared to the spring forces. The bearings would possess a certain inherent spring behavior which, depending on the age condition would be variable and could not be taken into consideration in the design and dimensioning of the vehicle spring system.

While we have shown and described only one embodiment in accordance with the present invenion, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An elastically yielding pivot bearing support of a structural part for the absorption of forces directed in at least one of the two directions consisting of axial and radial directions with respect to the pivot axis and for the transmission of said forces into a relatively fixed part, which includes at least two sleeve means with the space therebetween filled out by a rubber-elastic material of shock-absorbing layer thickness which is under radial prestress and forms a radial cushion means, one of said sleeve means being operatively connected with the relatively fixed part and the other with the structural part, at least one axial collar means moved along with the structural part and a further corresponding axial collar means moved along with the relatively fixed part, and a layer of rubber-elastic material of shock-absorbing thickness and forming an axial cushion means arranged between the two collar means, characterized in that an axial slide bearing means is arranged between a respective axial collar means and the associated axial cushion means, characterized in that the axial cushion means is provided axially on both end faces with a reinforcing means secured thereon, one of said reinforcing means forming one of the axial collar means and being supported at the end face of one of the sleeve means and the other reinforcing means cooperating as axial slide bearing means with the axial collar means connected with the other sleeve means and constructed as axial slide bearing ring, and characterized in that a sealing lip means is provided at the axial cushion means, which is substantially ring-shaped in cross section and axially overlaps the slide bearing gap and the axial slide bearing ring hook-shaped with a radial spacing, said sealing lip means abutting at the back side of the axial slide bearing ring under prestress at a surface thereof disposed substantially perpendicular to the axis.

2. A pivot bearing support according to claim 1, characterized in that the reinforcing means of the axial cushion means which serves on the slide bearing side as side bearing disk extends up to into the root of the hook-shaped sealing lip means.

3. A pivot bearing support according to claim 1, characterized in that the axial slide bearing ring includes an abutment shoulder extending beyond the axial dimension of the sealing lip means.

4. A pivot bearing support according to claim 1, characterized in that the reinforcing means of the axial cushion means on the sleeve side is provided on the outer end face with a thin rubber-elastic layer.

5. A pivot bearing support according to claim 1, wherein said inner and outer sleeve means are configured and connected to adhere substantially immovably at the contact surface of the rubberelastic material during pivot movements of the structural part, and wherein said axial cushion means is separate from the radial cushion means.

6. An elastically yielding pivot bearing support of a structural part for the absorption of forces directed in at least one of the two directions consisting of axial and radial directions with respect to the pivot axis and for the transmission of said forces into a relatively fixed part, which includes at least two sleeve means with the space therebetween filled out by a rubber-elastic material of shock-absorbing layer thickness which is under radial prestress and forms a radial cushion means, one of said sleeve means being operatively connected with the relatively fixed part and the other with the structural part, at least one axial collar means moved along with the structural part and a further corresponding axial collar means moved along with the relatively fixed part, and a layer of rubber-elastic material of shock-absorbing thickness and forming an axial cushion means arranged between the two collar means, characterized in that an axial slide bearing means is arranged between a respective axial collar means and the associated axial cushion means, characterized in that the axial cushion means is provided axially on both end faces with a reinforcing means secured thereon, one of said reinforcing means forming one of the axial collar means and being supported at the end face of one of the sleeve means and the other reinforcing means cooperating as axial slide bearing means with the axial collar means connected with the other sleeve means and constructed as axial slide bearing ring, and characterized in that the reinforcing means of the axial cushion means on the side of the respective sleeve means is supported at the end face of the outer sleeve means of the radial bearing means and in that the axial slide bearing ring is fixedly secured at the corresponding end face of the inner sleeve means, and that for this purpose the inner sleeve means is extended axially with respect to the end face of the outer sleeve means by the overall dimension of axial bearing and axial cushion means, whereby the pivot bearing support is constructed as a pre-assembled, prestressed assembly.

7. A pivot bearing support according to claim 6, characterized in that the pivot bearing support absorbs forces directed both axially and radially to the pivot axis.

8. A pivot bearing support according to claim 6, characterized in that the two sleeve means are arranged at least approximately coaxially in the installed condition.

9. A pivot bearing support according to claim 6, with two sleeve means forming an inner and an outer sleeve which are arranged substantially coaxially to one another.

10. A pivot bearing support according to clailm 6, characterized in that the relatively fixed part is the frame of a motor vehicle.

11. A pivot bearing support according to claim 6, characterized in that it forms a part of an individual wheel suspension of a motor vehicle wheel.

12. A pivot bearing support according to claim 6, characterized in that two of said axial cushion means are provided at respective opposite axial ends of the radial cushion means, said axial cushion means being formed separately from said radial cushion means.

13. A pivot bearing support according to claim 12, wherein said inner and outer sleeve means are configured and connected to adhere substantially immovably at the contact surface of the rubberelastic material during pivot movements of the structural part.

14. A pivot bearing support according to claim 6, characterized in that a further sleeve means is arranged in the radial cushion means radially between the outer and inner sleeve means, portions of said radial cushion means at one radial side of said further sleeve means being non-symmetrically configured with respect to a pivot axis of said pivot bearing support so as to give different spring characteristics in different radial directions from said pivot axis.

15. A pivot bearing support according to claim 14, characterized in that the further sleeve means is an intermediate sheet-metal sleeve.

16. A pivot bearing support for a cross guide member of an individual wheel suspension in vehicles according to claim 14, for the absorption of radial forces whose directions of action are limited essentially to two mutually perpendicular planes, characterized in that at least one of the two parts consisting of radial cushion means and outer sleeve means are so constructed that the elasticity of the pivot bearing support has different spring characteristics in the two planes of action.

17. A pivot bearing support according to claim 16, characterized in that the two directions of actions correspond to the direction of the gravitational force and the substantially horizontal direction.

18. A pivot bearing support according to claim 16, characterized in that both the radial cushion means and the outer sleeve means are so constructed that the elasticity of the pivot bearing support has different spring characteristics in the two planes of action.

19. A pivot bearing support according to claim 16, characterized in that at least one of the two parts consisting of radial cushion means and outer sleeve means is so constructed that the spring characteristics of the pivot bearing support in a horizontal direction are symmetrical to a center position.

20. A pivot bearing support according to claim 19 characterized in that both the radial cushion means and the outer sleeve means are so constructed that the spring characteristics of the pivot bearing support are symmetrical to a center position in the horizontal direction.

21. A pivot bearing support according to claim 19, characterized in that at least one of the two parts consisting of radial cushion means and the outer sleeve means is so constructed that the spring curve in the horizontal direction extends progressively increasing.

22. A pivot bearing support according to claim 21, characterized in that both the radial cushion means and the outer sleeve means are so constructed that the spring curve in the horizontal directions extends increasing progressively.

23. A pivot bearing support according to claim 21, characterized in that two of the sleeve means are arranged offset to one another eccentrically in the direction of the gravitational force in the unloaded condition of the pivot bearing support in such a manner that these two sleeve means are disposed substantially concentrically to one another under the load of a vehicle weight falling on the pivot bearing support as bearing prestress.

24. A pivot bearing support according to claim 23, characterized in that the two last-mentioned sleeve means are the inner sleeve means and the intermediate sleeve means.

25. A pivot bearing support according to claim 23, characterized in that at least one of the radial cushion means and the outer sleeve means is so constructed that the spring characteristics in the direction of the gravitational force is softer than in the horizontal direction.

26. A pivot bearing support according to claim 25, characterized in that both the radial cushion means and the outer sleeve means are so constructed that the spring characteristics in the direction of the gravitational force are softer than in the horizontal direction.

27. A pivot bearing support according to claim 25, characterized in that the radial cushion means is provided with flattened off portions at the places disposed in the installed condition at the top and at the bottom in the direction of the gravitational force, between which extends on both sides one arcuately shaped hump means.

28. A pivot bearing support according to claim 27, characterized in that the radial cushion means is provided with a substantially reniform aperture means between the inner sleeve means and the intermediate sleeve means, which aperture means, in the installed condition, is arranged substantially at the lowest place in the direction of the gravitational force.

29. A pivot bearing support according to claim 28, characterized in that the aperture means is interrupted by a narrow intermediate web remaining substantially axially in the center of the radial cushion means.

30. A pivot bearing support according to claim 29, characterized in that the aperture means extends in the circumferential direction approximately over an angle of 60°.

31. A pivot bearing support according to claim 30, characterized in that the hump means, as viewed in the circumferential direction, are provided starting from the center thereof, with aperture means of a size increasing toward the edges per circumferential unit length each.

32. A pivot bearing support according to claim 31, characterized in that the last-mentioned aperture means are provided in the form of at least one groove means extending in the circumferential direction and of varying depth.

33. A pivot bearing support according to claim 32, characterized in that the groove means is arranged axially symmetrically to the center of the radial cushion means.

34. A pivot bearing support according to claim 33, characterized in that the axial and radial cushion means are completely separate from each other.

35. A pivot bearing support according to claim 34, characterized in that the two sleeve means are arranged at least approximately coaxially in the installed condition.

36. A pivot bearing support according to claim 34, characterized in that two of said axial cushion means are provided at respective opposite axial ends of the radial cushion means, said axial cushion means being formed separately from said radial cushion means.

37. A pivot bearing support according to claim 6, characterized in that the fastening between the inner radial bearing sleeve means and the axial bearing slide ring takes place by a press fit.

38. A pivot bearing support according to claim 6, characterized in that the axial slide bearing ring is provided with a radially inwardly directed shoulder overlapping the end face of the inner sleeve means of the radial bearing means.

39. A pivot bearing support according to claim 6, characterized in that at least one of the radial cushion means and the outer sleeve means is so constructed that the spring characteristics in the direction of the gravitational force is softer than in the horizontal direction.

40. A pivot bearing support according to claim 39, characterized in that both the radial cushion means and the outer sleeve means are so constructed that the spring characteristics in the direction of the gravitational force are softer than in the horizontal direction.

41. A pivot bearing support according to claim 39, characterized in that the radial cushion means is provided with flattened off portions at the places disposed in the installed condition at the top and at the bottom in the direction of the gravitational force, between which extends on both sides one arcuately shaped hump means.

42. A pivot bearing support for a cross guide member of an individual wheel suspension in vehicles according to claim 6, for the absorption of radial forces whose directions of action are limited essentially to two mutually perpendicular planes, characterized in that at least one of the two parts consisting of radial cushion means and outer sleeve means are so constructed that the elasticity of the pivot bearing support has different spring characteristics in the two planes of action.

43. A pivot bearing support according to claim 42, characterized in that at least one of the two parts consisting of radial cushion means and outer sleeve means is so constructed that the spring characteristics of the pivot bearing support in a horizontal direction are symmetrical to a center position.

44. A pivot bearing support according to claim 42, characterized in that at least one of the two parts consisting of radial cushion means and the outer sleeve means is so constructed that the spring curve in the horizontal direction extends progressively increasing.

45. A pivot bearing support according to claim 42, characterized in that two of the sleeve means are arranged offset to one another eccentrically in the direction of the gravitational force in the unloaded condition of the pivot bearing support in such a manner that these two sleeve means are disposed substantially concentrically to one another under the load of a vehicle weight falling on the pivot bearing support as bearing prestress.

46. A pivot bearing support according to claim 42, characterized in that at least one of the radial cushion means and the outer sleeve means is so constructed that the spring characteristics in the direction of the gravitational force is softer than in the horizontal direction.

47. A pivot bearing support according to claim 42, characterized in that the radial cushion means is provided with flattened off portions at the places disposed in the installed condition at the top and at the bottom in the direction of the gravitational force, between which extends on both sides one arcuately shaped hump means.

48. A pivot bearing support according to claim 47, characterized in that the hump means, as viewed in the circumferential direction, are provided starting from the center thereof, with aperture means of a size increasing toward the edges per circumferential unit length each.

49. A pivot bearing support according to claim 48, characterized in that the last-mentioned aperture means are provided in the form of at least one groove means extending in the circumferential direction and of varying depth.

50. A pivot bearing support according to claim 49, characterized in that the groove means is arranged axially symmetrically to the center of the radial cushion means.

51. A pivot bearing support according to claim 6, characterized in that the portion of the radial cushion means between the inner sleeve means and an intermediate sleeve means is provided with a substantially reniform aperture means, which aperture means, in the installed condition, is arranged substantially at the lowest place in the direction of the gravitational force.

52. A pivot bearing support according to claim 51, characterized in that the aperture means is interrupted by a narrow intermediate web remaining substantially axially in the center of the radial cushion means.

53. A pivot bearing support according to claim 52, characterized in that the aperture means extends in the circumferential direction approximately over an angle of 60°.

54. A pivot bearing support according to claimd 6, wherein said inner and outer sleeve means are configured and connected to adhere substantially immovably at the contact surface of the rubber-elastic material during pivot movements of the structural part.

55. A pivot bearing support according to claim 6, wherein said axial cushion means is separate from the radial cushion means.

56. Apparatus according to claim 6, wherein said inner and outer sleeve means are configured and connected to adhere substantially immovably at the contact surface of the rubber-elastic material during pivot movements of the structural part, and wherein said axial cushion means is separate from the radial cushion means.

57. An elastically yielding pivot bearing support of a structural part for the absorption of forces directed in at least one of the two directions consisting of axial and radial directions with respect to the pivot axis and for the transmission of said forces into a relatively fixed part, which includes at least two sleeve means with the space therebetween filled out by a rubber-elastic material of shock-absorbing layer thickness which is under radial prestress and forms a radial cushion means, one of said sleeve means being operatively connected with the relatively fixed part and the other with the structural part, at least one axial collar means moved along with the structural part and a further corresponding axial collar means moved along with the relatively fixed part, and a layer of rubber-elastic material of shock-absorbing thickness and forming an axial cushion means arranged between the two collar means, characterized in that an axial slide bearing means is arranged between a respective axial collar means and the associated axial cushion means, and characterized in that a further sleeve means is arranged in the radial cushion means radially between the outer and inner sleeve means, portions of said radial cushion means at one radial side of said further sleeve means being non-symmetrically configured with respect to a pivot axis of said pivot bearing support so as to give different spring characteristics in different radial directions from said pivot axis.

58. A pivot bearing support according to claim 57, characterized in that the axial cushion means is provided axially on both end faces with a reinforcing means secured thereon, one of said reinforcing means forming one of the axial collar means and being supported at the end face of one of the sleeve means and the other reinforcing means cooperating as axial slide bearing means with the axial collar means connected with the other sleeve means and constructed as axial slide bearing ring.

59. A pivot bearing support according to claim 58 characterized in that the reinforcing means are sheet-metal reinforcing members which are vulcanized onto the two end faces of the axial cushion means.

60. A pivot bearing support according to claim 58 characterized in that the reinforcing means supported at the end face of said one sleeve means is provided with a circularly shaped indentation substantially concentric to the bearing axis which serves as centering shoulder of the axial cushion means at the end face of the respective sleeve means.

61. A pivot bearing support according to claim 60 characterized in that a sealing lip means is provided at the axial cushion means, which is substantially ring-shaped in cross section and axially overlaps the slide bearing gap and the axial slide bearing ring hook-shaped with a radial spacing, said sealing lip means abutting at the back side of the axial slide bearing ring under prestress at a surface thereof disposed substantially perpendicular to the axis.

62. A pivot bearing support according to claim 61 characterized in that the reinforcing means of the axial cushion means which serves on the slide bearing side as slide bearing disk extends up to into the root of the hook-shaped sealing lip means.

63. A pivot bearing support according to claim 62, characterized in that the reinforcing means serving as slide bearing disk is provided on the slide side with a sintered bronze layer and with a layer of polytetrafluoroethylene embedded therein.

64. A pivot bearing support according to claim 63, characterized in that the reinforcing means of the axial cushion means on the side of the respective sleeve means is supported at the end face of the outer sleeve means of the radial bearing means and in that the axial slide bearing ring is secured at the corresponding end face of the inner sleeve means, and that for this purpose the inner sleeve means is extended axially with respect to the end face of the outer sleeve means by the overall dimension of axial bearing and axial cushion means.

65. A pivot bearing support according to claim 64, characterized in that the fastening between the inner radial bearing sleeve means and the axial bearing slide ring takes place by a press fit.

66. A pivot bearing support according to claim 65, characterized in that the axial slide bearing ring is provided with a radially inwardly directed shoulder overlapping the end face of the inner sleeve means of the radial bearing means.

67. A pivot bearing support according to claim 66, characterized in that the axial slide bearing ring includes an abutment shoulder extending beyond the axial dimension of the sealing lip means.

68. A pivot bearing support according to claim 67, characterized in that the reinforcing means of the axial cushion means on the sleeve side is provided on the outer end face with a thin rubber-elastic layer.

69. A pivot bearing support according to claim 58, characterized in that the reinforcing means serving as slide bearing disk is provided on the slide side with a sintered bronze layer and with a layer of polytetrafluoroethylene embedded therein.

70. A pivot bearing support according to claim 57, characterized in that the further sleeve means is an intermediate sheet-metal sleeve.

71. A pivot bearing support for a cross guide member of an individual wheel suspension in vehicles according to claim 57, for the absorption of radial forces whose directions of action are limited essentially to two mutually perpendicular planes, characterized in that at least one of the two parts consisting of radial cushion means and outer sleeve means are so constructed that the elasticity of the pivot bearing support has different spring characteristics in the two planes of action.

72. A pivot bearing support according to claim 71, characterized in that the two directions of actions correspond to the direction of the gravitational force and the substantially horizontal direction.

73. A pivot bearing support according to claim 71, characterized in that both the radial cushion means and the outer sleeve means are so constructed that the elasticity of the pivot bearing support has different spring characteristics in the two planes of action.

74. A pivot bearing support according to claim 71, characterized in that at least one of the two parts consisting of radial cushion means and outer sleeve means is so constructed that the spring characteristics of the pivot bearing support in a horizontal direction are symmetrical to a center position.

75. A pivot bearing support according to claim 74, characterized in that both the radial cushion means and the outer sleeve means are so constructed that the spring characteristics of the pivot bearing support are symmetrical to a center position in the horizontal direction.

76. A pivot bearing support according to claim 71, characterized in that at least one of the two parts consisting of radial cushion means and the outer sleeve means is so constructed that the spring curve in the horizontal direction extends progressively increasing.

77. A pivot bearing support according to claim 76, characterized in that both the radial cushion means and the outer sleeve means are so constructed that the spring curve in the horizontal direction extends increasing progressively.

78. A pivot bearing support according to claim 57, characterized in that two of said axial cushion means are provided at respective opposite axial ends of the radial cushion means, said axial cushion means being formed separately from said radial cushion means.

79. A pivot bearing support according to claim 78, characterized in that the axial cushion means is provided axially on both end faces with a reinforcing means secured thereon, one of said reinforcing means forming one of the axial collar means and being supported at the end face of one of the sleeve means and the other reinforcing means cooperating as axial slide bearing means with the axial collar means connected with the other sleeve means and constructed as axial slide bearing ring.

80. A pivot bearing support according to claim 79, characterized in that the reinforcing means are sheet-metal reinforcing members which are vulcanized onto the two end faces of the axial cushion means.

81. A pivot bearing support according to claim 79, characterized in that the reinforcing means supported at the end face of said one sleeve means is provided with a circularly shaped indentation substantially concentric to the bearing axis which serves as centering shoulder of the axial cushion means at the end face of the respective sleeve means.

82. A pivot bearing support according to claim 79, characterized in that a sealing lip means is provided at the axial cushion means, which is substantially ring-shaped in cross section and axially overlaps the slide bearing gap and the axial slide bearing ring hook-shaped with a radial spacing, said sealing lip means abutting at the back side of the axial slide bearing ring under prestress at a surface thereof disposed substantially perpendicular to the axis.

83. A pivot bearing support according to claim 82, characterized in that the reinforcing means of the axial cushion means which serves on the slide bearing side as slide bearing disk extends up to into the root of the hook-shaped sealing lip means.

84. A pivot bearing support according to claim 82, characterized in that the reinforcing means serving as slide bearing disk is provided on the slide side with a sintered bronze layer and with a layer of polytetrafluoroethylene embedded therein.

85. A pivot bearing support according to claim 82, characterized in that the reinforcing means of the axial cushion means on the side of the respective sleeve means is supported at the end face of the outer sleeve means of the radial bearing means and in that the axial slide bearing ring is secured at the corresponding end face of the inner sleeve means, and that for this purpose the inner sleeve means is extended axially with respect to the end face of the other sleeve means by the overall dimension of axial bearing and axial cushion means.

86. A pivot bearing support according to claim 85, characterized in that the fastening between the inner radial bearing sleeve means and the axial bearing slide ring takes place by a press fit.

87. A pivot bearing support according to claim 82 characterized in that the reinforcing means of the axial cushion means on the sleeve side is provided on the outer end face with a thin-rubber-elastic layer.

88. A pivot bearing support according to claim 57, wherein said inner and outer sleeve means are configured and connected to adhere substantially immovably at the contact surface of the rubber-elastic material during pivot movements of the structural part, and wherein said axial cushion means is separate from the radial cushion means.

89. An elastically yielding pivot bearing support of structural part for the absorption of forces directed in at least one of the two directions consisting of axial and radial directions with respect to the pivot axis and for the transmission of said forces into a relatively fixed part, which includes at least two sleeve means with the space therebetween filled out by a rubber-elastic material of shock-absorbing layer thickness which is under radial prestress and forms a radial cushion means, one of said sleeve means being operatively connected with the relatively fixed part and the other with the structural part, at least one axial collar means moved along with the structural part and a further corresponding axial collar means moved along with the relatively fixed part, and a layer of rubber-elastic material of shock-absorbing thickness and forming an axial cushion means arranged between the two collar means, characterized in that an axial slide bearing means is arranged between a respective axial collar means and the associated axial cushion means, and characterized in that two of the sleeve means are arranged offset to one another eccentrically in the direction of the gravitational force in the unloaded condition of the pivot bearing support in such a manner that these two sleeve means are disposed substantially concentrically to one another under the load of a vehicle weight falling on the pivot bearing support as being prestress.

90. A pivot bearing support according to claim 89 characterized in that the two last-mentioned sleeve means are the inner sleeve means and the intermediate sleeve means.

91. A pivot bearing support according to claim 89, wherein said inner and outer sleeve means are configured and connected to adhere substantially immovably at the contact surface of the rubber-elastic material during pivot movements of the structural part, and wherein said axial cushion means is separate from the radial cushion means.

92. An elastically yielding pivot bearing support of a structural part for the absorption of forces directed in at least one of the two directions consisting of axial and radial directions with respect to the pivot axis and for the transmission of said forces into a relatively fixed part, which includes at least two sleeve means with the space therebetween filled out by a rubber-elastic material of shock-absorbing layer thickness which is under radial prestress and forms a radial cushion means, one of said sleeve means being operatively connected with the relatively fixed part and the other with the structural part, at least one axial collar means moved along with the structural part and a further corresponding axial collar means moved along with the relatively fixed part, and a layer of rubber-elastic material of shock-absorbing thickness and forming an axial cushion means arranged between the two collar means, characterized in that an axial slide bearing means is arranged between a respective axial collar means and the associated axial cushion means, characterized in that at least one of the radial cushion means and the outer sleeve means is so constructed that the spring characteristics in the direction of the gravitational force is softer than in the horizontal direction, and characterized in that the portion of the radial cushion means between the inner sleeve means and an intermediate sleeve means is provided with a substantially reniform aperture means, which aperture means, in the installed condition, is arranged substantially at the lowest place in the direction of the gravitational force.

93. A pivot bearing support according to claim 92, characterized in that the aperture means is interrupted by a narrow intermediate web remaining substantially axially in the center of the radial cushion means.

94. A pivot bearing support according to claim 92, characterized in that the aperture means extends in the circumferential direction approximately over an angle of 60°.

95. A pivot bearing support according to claim 92, characterized in that a further sleeve means is arranged in the radial cushion means radially between the outer and inner sleeve means, portions of said radial cushion means at one radial side of said further sleeve means being non-symmetrically configured with respect to a pivot axis of said pivot bearing support so as to give different spring characteristics in different radial directions from said pivot axis.

96. A pivot bearing support according to claim 92, characterized in that the radial cushion means is provided with flattened off portions at the places disposed in the installed condition at the top and at the bottom in the direction of the gravitational force, between which extends on both sides one arcuately shaped hump means.

97. A pivot bearing support according to claim 96, characterized in that the radial cushion means is provided with a substantially reniform aperture means between the inner sleeve means and an intermediate sleeve means, which aperture means, in the installed condition, is arranged substantially at the lowest place in the direction of the gravitational force.

98. A pivot bearing support according to claim 97, characterized in that the aperture means is interrupted by a narrow intermediate web remaining substantially axially in the center of the radial cushion means.

99. A pivot bearing support according to claim 98, characterized in that the aperture means extends in the circumferential direction approximately over an angle of 60°.

100. A pivot bearing support according to claim 97, characterized in that the hump means, as viewed in the circumferential direction, are provided starting from the center thereof, with aperture means of a size increasing toward the edges per circumferential unit length each.

101. A pivot bearing support according to claim 100, characterized in that the last-mentioned aperture means are provided in the form of at least one groove means extending in the circumferential direction and of varying depth.

102. A pivot bearing support according to claim 101, characterized in that the groove means is arranged axially symmetrically to the center of the radial cushion means.

103. A pivot bearing support according to claim 92, wherein said inner and outer sleeve means are configured and connected to adhere substantially immovably at the contact surface of the rubber-elastic material during pivot movements of the structural part, and wherein said axial cushion means is separate from the radial cushion means.

104. An elastically yielding pivot bearing support of a structural part for the absorption of forces directed in at least one of the two directions consisting of axial and radial directions with respect to the pivot axis and for the transmission of said forces into a relatively fixed part, which includes at least two sleeve means with the space therebetween filled out by a rubber-elastic material of shock-absorbing layer thickness which is under radial prestress and forms a radial cushion means, one of said sleeve means being operatively connected with the relatively fixed part and the other with the structural part, at least one axial collar means along with the structural part and a further corresponding axial collar means moved along with the relatively fixed part, and a layer of rubber-elastic material of shock-absorbing thickness and forming an axial cushion means arranged between the two collar means, characterized in that an axial slide bearing means is arranged between a respective axial collar means and the associated axial cushion means, characterized in that at least one of the radial cushion means and the outer sleeve means is so constructed that the spring characteristics in the direction of the gravitational force is softer than in the horizontal direction, characterized in that the radial cushion means is provided with flattened off portions at the places disposed in the installed condition at the top and at the bottom in the direction of the gravitational force, between whch extends on both sides one arcuately shaped hump means, and characterized in that the hump means, as viewed in the circumferential direction, are provided starting from the center thereof, with aperture means of a size increasing toward the edges per circumferential unit length each, whereby a continuous variance of the spring characteristics from the direction of the gravitational force to the horizontal direction is obtained.

105. A pivot bearing support according to claim 104, characterized in that the last-mentioned aperture means are provided in the form of at least one groove means extending in the circumferential direction and of varying depth.

106. A pivot bearing support according to claim 105, characterized in that the groove means is arranged axially symmetrically to the center of the radial cushion means.

107. A pivot bearing support according to claim 104, characterized in that the axial cushion means is provided axially on both end faces with a reinforcing means secured thereon, one of said reinforcing means forming one of the axial collar means and being supported at the end face of one of the sleeve means and the other reinforcing means cooperating as axial slide bearing means with the axial collar means connected with the other sleeve means and constructed as axial slide bearing ring.

108. A pivot bearing support according to claim 107, characterized in that the reinforcing means supported at the end face of said one sleeve means is provided with a circularly shaped indentation substantially concentric to the bearing axis which serves as centering shoulder of the axial cushion means at the end face of the respective sleeve means.

109. A pivot bearing support according to claim 107, characterized in that a sealing lip means is provided at the axial cushion means, which is substantially ring-shaped in cross section and axially overlaps the slide bearing gap and the axial slide bearing ring hook-shaped with a radial space, said sealing lip means abutting at the back side of the axial slide bearing ring under prestress at a surface thereof disposed substantially perpendicular to the axis.

110. A pivot bearing support according to claim 109, characterized in that the reinforcing means of the axial cushion means which serves on the slide bearing side as slide bearing disk extends up to into the root of the hook-shaped sealing lip means.

111. A pivot bearing support according to claim 109, characterized in that the reinforcing means serving as slide bearing disk is provided on the slide side with a sintered bronze layer and with a layer of polytetrafluoroethylene embedded therein.

112. A pivot bearing support according to claim 109, characterized in that the reinforcing means of the axial cushion means on the side of the respective sleeve means is supported at the end face of the outer sleeve means of the radial bearing means and in that the axial slide bearing ring is fixedly secured at the corresponding end face of the inner sleeve means, and that for this purpose the inner sleeve means is extended axially with respect to the end face of the outer sleeve means by the overall dimension axial bearing and axial cushion means, whereby the pivot bearing support is constructed as a pre-assembled, prestressed assembly.

113. A pivot bearing support according to claim 112, characterized in that the fastening between the inner radial bearing sleeve means and the axial bearing slide ring takes place by a press fit.

114. A pivot bearing support according to claim 112, characterized in that the axial slide bearing ring is provided with a radially inwardly directed shoulder overlapping the end face of the inner sleeve means of the radial bearing means.

115. A pivot bearing support according to claim 112, characterized in that the axial slide bearing ring includes an abutment shoulder extending beyond the axial dimension of the sealing lip means.

116. A pivot bearing support according to claim 112, characterized in that the reinforcing means of the axial cushion means on the sleeve side is provided on the outer end face with a thin rubber-elastic layer.

117. A pivot bearing support for a cross guide member of an individual wheel suspension in vehicles according to claim 109, for the absorption of radial forces whose directions of action are limited essentially to two mutually perpendicular planes, characterized in that at least one of the two parts consisting of radial cushion means and outer sleeve means are so constructed that the elasticity of the pivot bearing support has different spring characteristics in the two planes of action.

118. A pivot bearing support according to claim 117, characterized in that at least one of the two parts consisting of radial cushion means and outer sleeve means is so constructed that the spring characteristics of the pivot bearing support in a horizontal direction are symmetrical to a center position.

119. A pivot bearing support according to claim 118, characterized in that at least one of the two parts consisting of radial cushion means and the outer sleeve means is so constructed that the spring curve in the horizontal direction extends progressively increasing.

120. A pivot bearing support according to claim 119, characterized in that two of the sleeve means are arranged offset to one another eccentrically in the direction of the gravitational force in such a manner that these two sleeve means are disposed substantially concentrically to one another under the proportion of the vehicle weight falling on the pivot bearing support as bearing prestress.

121. A pivot bearing support according to claim 117, characterized in that at least one of the radial cushion means and the outer sleeve means is so constructed that the spring characteristics in the direction of the gravitational force is softer than in the horizontal direction.

122. A pivot bearing support according to claim 104, wherein said inner and outer sleeve means are configured and connected to adhere substantially immovably at the contact surface of the rubber-elastic material during pivot movements of the structural part, and wherein said axial cushion means is separate from the radial cushion means.

* * * * *